US010858469B2

(12) United States Patent
Joe et al.

(10) Patent No.: US 10,858,469 B2
(45) Date of Patent: Dec. 8, 2020

(54) LATEX COMPOSITION FOR DIP MOLDING, AND MOLDED PRODUCT MANUFACTURED THEREFROM

(71) Applicant: LG Chem, Ltd., Seoul (KR)

(72) Inventors: Won Tae Joe, Daejeon (KR); Seung Uk Yeu, Daejeon (KR); Seung Hun Yang, Daejeon (KR); Jung Su Han, Daejeon (KR); Ji Hyun Kim, Daejeon (KR)

(73) Assignee: LG Chem, Ltd.

( * ) Notice: Subject to any disclaimer, the term of this patent is extended or adjusted under 35 U.S.C. 154(b) by 134 days.

(21) Appl. No.: 16/086,777

(22) PCT Filed: Aug. 23, 2017

(86) PCT No.: PCT/KR2017/009175
§ 371 (c)(1),
(2) Date: Sep. 20, 2018

(87) PCT Pub. No.: WO2018/048122
PCT Pub. Date: Mar. 15, 2018

(65) Prior Publication Data
US 2019/0127507 A1 May 2, 2019

(30) Foreign Application Priority Data
Sep. 9, 2016 (KR) ......................... 10-2016-0116102

(51) Int. Cl.
| | | |
|---|---|---|
| *C08L 13/02* | (2006.01) | |
| *C08L 33/20* | (2006.01) | |
| *C08L 9/02* | (2006.01) | |
| *C08F 236/12* | (2006.01) | |
| *B29C 41/14* | (2006.01) | |
| *C08K 3/30* | (2006.01) | |
| *A41D 19/00* | (2006.01) | |
| *C08F 236/06* | (2006.01) | |
| *C08L 9/04* | (2006.01) | |
| *C08J 5/02* | (2006.01) | |
| *B29C 41/00* | (2006.01) | |
| *B29K 33/20* | (2006.01) | |
| *B29L 31/48* | (2006.01) | |

(52) U.S. Cl.
CPC ........ *C08F 236/12* (2013.01); *A41D 19/0062* (2013.01); *B29C 41/003* (2013.01); *B29C 41/14* (2013.01); *C08F 236/06* (2013.01); *C08J 5/02* (2013.01); *C08K 3/30* (2013.01); *C08L 9/04* (2013.01); *C08L 13/02* (2013.01); *B29K 2033/20* (2013.01); *B29L 2031/4864* (2013.01); *C08F 2800/20* (2013.01); *C08J 2309/04* (2013.01); *C08K 2003/3009* (2013.01); *C08L 9/02* (2013.01); *C08L 33/20* (2013.01)

(58) Field of Classification Search
CPC .... C08L 9/04; C08L 9/02; C08L 13/00; C08L 35/04; C08L 13/02; C08L 33/18; C08L 33/20; A41D 19/00
See application file for complete search history.

(56) References Cited

U.S. PATENT DOCUMENTS

| | | | |
|---|---|---|---|
| 3,318,854 A | 5/1967 | Honn et al. | |
| 6,187,857 B1 | 2/2001 | Ozawa et al. | |
| 6,492,446 B1 | 12/2002 | Kajiwara et al. | |
| 10,100,179 B2 * | 10/2018 | Joe | C08L 9/04 |
| 2002/0111431 A1 | 8/2002 | Kajiwara et al. | |
| 2012/0149859 A1 | 6/2012 | Yang et al. | |
| 2013/0291873 A1 | 11/2013 | Lucas et al. | |
| 2015/0225553 A1 | 8/2015 | Yang et al. | |
| 2015/0232637 A1 | 8/2015 | Cha et al. | |
| 2016/0244575 A1 | 8/2016 | Kim et al. | |
| 2016/0326271 A1 | 11/2016 | Obrecht | |
| 2017/0298210 A1 | 10/2017 | Joe et al. | |
| 2017/0342242 A1 * | 11/2017 | Kato | C08K 3/06 |
| 2018/0051163 A1 * | 2/2018 | Kato | C08C 19/22 |
| 2019/0106555 A1 * | 4/2019 | Yang | C08L 9/04 |

FOREIGN PATENT DOCUMENTS

| | | |
|---|---|---|
| CN | 1358808 A | 7/2002 |
| CN | 104169354 A | 11/2014 |
| CN | 107075141 A | 8/2017 |
| JP | 2003165814 A | 6/2003 |
| JP | 4049818 B2 | 2/2008 |
| KR | 20100066005 A | 6/2010 |
| KR | 20100133638 A | 12/2010 |
| KR | 20140141919 A | 12/2014 |
| KR | 20150019007 A | 2/2015 |
| KR | 101570568 B1 | 11/2015 |

(Continued)

OTHER PUBLICATIONS

Supplemental European Search Report for EP17849006.6 dated May 8, 2019.
Search report from International Application No. PCT/KR2017/009175, dated Dec. 4, 2017.
Lim, Jeewoo, et al., "High Sulfur Content Polymer Nanoparticles Obtained from Interfacial Polymerization of Sodium Plysulfide and 1,2,3-Trichloropropane in Water." Macromolecular Rapid Communications, Received: Jan. 5, 2015; Revised: Feb. 28, 2015; vol. 36, pp. 1103-1107.

(Continued)

*Primary Examiner* — Rip A Lee
(74) *Attorney, Agent, or Firm* — Lerner, David, Littenberg, Krumholz & Mentlik, LLP

(57) ABSTRACT

The present invention relates to a latex composition for dip-molding and a molded article produced therefrom. More specifically, the composition not only has gentle syneresis, and excellent tensile strength, elongation and modulus, and excellent durability against perspiration, but also is capable of preparing the dip-molded articles having excellent wearing sensation.

11 Claims, No Drawings

(56) References Cited

FOREIGN PATENT DOCUMENTS

| KR | 101573980 B1 | 12/2015 |
|---|---|---|
| KR | 101657346 B1 | 9/2016 |
| KR | 20160105837 A | 9/2016 |
| WO | 2014142425 A1 | 9/2014 |
| WO | 2015101602 A1 | 7/2015 |
| WO | 2016099307 A1 | 6/2016 |

OTHER PUBLICATIONS

Chinese Search Report for Application No. 201780027059.1, dated Mar. 12, 2020, pp. 1-2.

* cited by examiner

LATEX COMPOSITION FOR DIP MOLDING, AND MOLDED PRODUCT MANUFACTURED THEREFROM

CROSS-REFERENCE TO RELATED APPLICATIONS

The present application is a national phase entry under 35 U.S.C. § 371 of International Application No. PCT/KR2017/009175 filed on Aug. 23, 2017, which claims priority from Korean Patent Application No. 10-2016-0116102, filed on Sep. 9, 2016, the entire contents of which are incorporated herein by reference.

TECHNICAL FIELD

The present invention relates to a latex composition for dip-molding which can be used to prepare a dip-molded article with gentle syneresis, excellent tensile strength, elongation and modulus characteristics, and excellent durability against perspiration by using sodium polysulfide having hydrophilic property as a vulcanizing agent, and a molded article produced therefrom.

BACKGROUND ART

The disposable rubber gloves which are used in a variety of everyday life, such as housework, food industry, electronic industry, medical field are made by dip-molding of natural rubber or nitrile based copolymer latex. In recent years, the nitrile glove is attracting attention in the disposable glove market due to the problem of allergies of natural rubber and its unstable supply and demand.

In the nitrile glove market which is replacing natural rubber gloves, improvement in workability in the manufacture of gloves and durability in the use of gloves have become important parts in recent years. Therefore, it is aimed to improve the syneresis time in order to improve the workability of glove production, and to produce gloves that are not rigid but do not easily tear in order to improve durability and wearing sensation.

In particular, wearing sensation of a glove is closely related to the modulus value. That is, there is a problem that the smaller the modulus, the higher the wearing sensation but the lower the physical properties (the tensile strength, elongation and modulus) of the glove itself. In addition, there is a problem that the glove is denatured or torn due to perspiration which occurs when the glove is worn for a long period of time. Therefore, it is urgent to develop a product which does not have a problem in human use for a long period of time through improvement of durability.

On the other hand, a vulcanizing agent is used for cross-linking in the production of molded parts using nitrile based copolymer latex. The vulcanizing agent is suitably selected according to the composition, the molecular distribution state, the structure, and the like of the nitrile latex.

Sulfur such as powdered sulfur, insoluble sulfur, precipitated sulfur, and colloidal sulfur are used as representative vulcanizing agents, and to promote this, zinc oxide, magnesium oxide, lead oxide (PbO) and the like are used.

The nitrile based copolymer is prepared as latex of water dispersion type in order to ensure that the blend is uniformly mixed and that precipitation does not occur. In the latex, nitrile based copolymers are cross-linked with each other by sulfur which is a vulcanizing agent and at this time, when sulfur permeates into the latex particles, cross-linking occurs smoothly. Furthermore, cross-linking using sulfur requires aging for a long period of time. At this time, when the stability of the latex is low, a film is formed on the surface or aggregation occurs, and when the aging process is insufficient, it becomes difficult to uniformly mix the latex and the compounding agents.

In order to prepare products such as ordinary gloves and the like, after the nitrile based latex is prepared, compounding agents such as various additives including a vulcanizing agent are mixed. At this time, since the content of the vulcanizing agent directly affects the modulus, the stability of the latex should also be considered very important.

PRIOR ART LITERATURE (Patent Document 1) Korean Patent Publication No. 2010-0066005, "Rubber composition and rubber gloves made using the same".

DISCLOSURE

Technical Problem

As a result of various studies to solve the above problems, the inventors of the present invention confirmed that when sodium polysulfide with hydrophilicity is mixed with carboxylic acid-modified nitrile based copolymer latex as vulcanizing agent and dip-molding is performed using the mixture resulted, it is possible to prepare dip-molded articles with gentle syneresis, excellent physical properties relating to tensile strength, elongation and modulus, improved durability against perspiration, improved wearing sensation through the reduction of modulus, thereby completing the present invention.

Therefore, it is an object of the present invention to provide a latex composition for dip-molding comprising carboxylic acid-modified nitrile based copolymer latex and sodium polysulfide.

In addition, another object of the present invention is to provide a dip-molded article having gentle syneresis, excellent physical properties and durability against perspiration by preparing from the latex composition for dip-molding.

Technical Solution

In order to achieve the above object, the present invention provides latex compositions for dip-molding characterized by including carboxylic acid-modified nitrile based copolymer latex copolymerized from conjugated diene-based monomer, ethylenically unsaturated nitrile monomer and ethylenically unsaturated acid monomer, and sodium polysulfide.

At this time, the latex composition for dip-molding is characterized by containing 0.1 to 5 parts by weight of sodium polysulfide based on 100 parts by weight of carboxylic acid-modified nitrile based copolymer.

In addition, the present invention provides a dip-molded article characterized in that it is prepared by dip-molding the latex composition for dip-molding.

Advantageous Effects

The latex composition for dip-molding according to the present invention improves workability by using sodium polysulfide with hydrophilicity as vulcanizing agent and thus achieving gentle syneresis during the dip-molding process.

Particularly, the dip-molded article cross-linked by using the sodium polysulfide not only has equivalent or higher tensile strength, elongation and modulus as compared to products using conventional sulfur as vulcanizing agent, but also improves durability against perspiration. In addition, the dip-molded article has a lower modulus than that of the products using conventional sulfur and thus can give a good feel of use when worn on the human body.

The dip-molded article can be easily applied to industries in need thereof, such as inspection gloves, condoms, catheters, industrial gloves, household gloves and health care products.

BEST MODE

Hereinafter, the present invention will be explained in more detail to assist the understanding thereof.

It will be understood that words or terms used in the specification and claims shall not be interpreted as limited to the meaning defined in commonly used dictionaries, and that the words or terms should be interpreted as having a meaning and concept that are consistent with the technical idea of the invention, based on the principle that an inventor may properly define the meaning of the words or terms to best explain the invention.

Latex Composition for Dip-Molding

The present invention proposes a latex composition for dip-molding comprising a carboxylic acid-modified nitrile based copolymer latex wherein sodium polysulfide with excellent hydrophilicity is used instead of sulfur as a vulcanizing agent.

The sodium polysulfide, also known as polysulfide rubber, is a hydrophilic vulcanizing agent made by adding sulfur ($S_8$) to a strong basic aqueous solution, which is represented by $Na_2S_x$ (x=2 to 5). In the aqueous solution of sodium polysulfide, sulfur is ionized to form a polysulfide anion such as disulfide ($S_2^{2-}$), trisulfide ($S_3^{2-}$), tetrasulfide ($S_4^{2-}$), and pentasulfide ($S_5^{2-}$).

More specifically, when the sodium polysulfide is dissolved in the aqueous solution, its terminal is ionized to S anion together with Na cation as shown in the following formula (1) and the sodium polysulfide has a structure connected by —S—S— bond in the molecular structure:

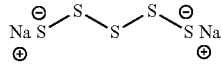

[Formula 1]

At this time, the S anion reacts with a carboxylic acid-modified nitrile based copolymer to proceed a cross-linking reaction through the —S—S— structure.

The aqueous solution of sodium polysulfide has, when mixing, the advantage of being uniformly mixed with the carboxylic acid-modified nitrile based copolymer since it is more hydrophilic than the existing vulcanizing agent ($S_8$). The sodium polysulfide is easily accessible to the inside of the latex where hydrophilic and hydrophobic inner and outer boundaries are formed by the Na cation present at both ends of the polysulfide, and thus makes cross-linking of carboxylic acid-modified nitrile based copolymers smoother.

The cross-linking using the aqueous sodium polysulfide solution is the same as that of the conventional sulfur (S8) powder, and thus can produce a dip-molded article having equivalent or higher tensile strength and elongation compared to the conventional vulcanizing agent. Also, referring to the data related to the modulus at 300% and 500%, the dip-molded article according to the present invention has a low modulus as compared to the dip-molded article using sulfur powder (see Table 1 and Table 2), and has a good feel of use in the body due to its excellent elastic properties. In addition, it is possible to ensure the advantages of excellent durability against perspiration.

The preparation of the aqueous solution of sodium polysulfide is not particularly limited in the present invention and can be prepared by the method known in the art. For example, the aqueous solution is prepared by dissolving Sodium Sulfide in distilled water to make a strong basic aqueous solution and then adding sulfur ($S_8$) powder [Macromol. Rapid Commun. 2015, 36, 1103-1107]. At this time, it is preferable that the sodium polysulfide solution has a concentration of 5 to 20 wt. % considering the precipitation of sulfur in the aqueous solution.

Such sodium polysulfide is used in 0.1 to 5 parts by weight, preferably 0.5 to 1 part by weight, relative to 100 parts by weight of carboxylic acid-modified nitrile based copolymer latex, calculated as solids content. If the content of the sodium polysulfide is less than the above range, the above-mentioned effects cannot be ensured. On the contrary, if it exceeds the above range, syneresis occurs and the physical properties are deteriorated due to excessive curing and a dip-molded article having a stiff wearing sensation is produced. Therefore, the sodium polysulfide is suitably used within the above range The sodium polysulfide is used in such a way to add to a latex of carboxylic acid-modified nitrile based copolymer.

Hereinafter, the carboxylic acid-modified nitrile based copolymer disclosed in the present invention will be described in more detail.

The carboxylic acid-modified nitrile-based copolymer is a copolymer copolymerized from conjugated diene-based monomer, ethylenically unsaturated nitrile monomer and ethylenically unsaturated acid monomer, as already mentioned.

First, the conjugated diene-based monomer is a monomer constituting the carboxylic acid-modified nitrile based copolymer according to the present invention. Specific examples thereof include at least one selected from the group consisting of 1,3-butadiene, 2,3-dimethyl-1,3-butadiene, 2-ethyl-1,3-butadiene, 1,3-pentadiene and isoprene. Among these, 1,3-butadiene and isoprene are preferable, and 1,3-butadiene is most preferably used.

The conjugated diene-based monomer can be included in an amount of from 40 to 89 wt. %, preferably from 45 to 80 wt. %, more preferably from 50 to 78 wt. %, based on the total weight of 100 wt. % of the total monomers constituting the carboxylic acid-modified nitrile-based copolymer. If the content is less than the above range, the dip-molded article becomes stiff and the wearing sensation deteriorates. On the contrary, if it exceeds the above range, the oil resistance of the dip-molded article deteriorates and the tensile strength decreases.

As other monomer constituting the carboxylic acid-modified nitrile based copolymer according to the present invention, the ethylenically unsaturated nitrile monomer is at least one selected from the group consisting of acrylonitrile, methacrylonitrile, fumaronitrile, α-chloronitrile and α-cyanoethyl acrylonitrile. Among these, acrylonitrile and methacrylonitrile are preferable, and acrylonitrile is most preferably used.

The ethylenically unsaturated nitrile monomer can be included in an amount of 10 to 50 wt. %, preferably 15 to 45 wt. %, more preferably 25 to 45 wt. % based on the total weight of 100 wt. % of the total monomers constituting the carboxylic acid-modified nitrile-based copolymer. If the content is less than the above range, the oil resistance of the dip-molded article deteriorates and the tensile strength decreases. On the contrary, if it exceeds the above range, the dip-molded article becomes stiff and the wearing sensation deteriorates.

Also, as other monomer constituting the carboxylic acid-modified nitrile based copolymer according to the present invention, the ethylenically unsaturated acid monomer is an ethylenically unsaturated acid monomer containing at least one acidic group selected from the group consisting of a carboxyl group, a sulfonate group and an acid anhydride group. The ethylenically unsaturated acid monomer includes, for example, the ethylenically unsaturated carboxylic acid monomer such as acrylic acid, methacrylic acid, itaconic acid, maleic acid, or fumaric acid; polycarboxylic anhydrides such as maleic anhydride and citraconic anhydride; ethylenically unsaturated sulfonic acid monomers such as styrene sulfonate; ethylenically unsaturated polycarboxylic acid partial ester monomers such as monobutyl fumarate, monobutyl maleate and mono-2-hydroxypropyl maleate. Among these, methacrylic acid is particularly preferable. These ethylenically unsaturated acid monomers can be used in the form of alkali metal salts or ammonium salts, etc.

The ethylenically unsaturated acid monomer can be included in an amount of 0.1 to 10 wt. %, preferably 0.5 to 9 wt. %, more preferably 1 to 8 wt. % based on the total weight of 100 wt. % of the total monomers constituting the carboxylic acid-modified nitrile-based copolymer. If the content is less than the above range, the tensile strength of the dip-molded article decreases. On the contrary, if it exceeds the above range, the dip-molded article becomes stiff and the wearing sensation deteriorates.

The carboxylic acid-modified nitrile based copolymer according to the present invention may optionally further comprise other ethylenically unsaturated monomer capable of copolymerizing with the ethylenically unsaturated nitrile monomer and the ethylenically unsaturated acid monomer.

The copolymerizable ethylenically unsaturated monomer may include at least one selected from the group consisting of vinyl aromatic monomers including styrene, alkyl styrene and vinyl naphthalene; fluoroalkyl vinyl ether including fluoroethyl vinyl ether; ethylenically unsaturated amide monomer including (meth)acrylamide, N-methylol (meth)acrylamide, N,N-dimethylol (meth)acrylamide, N-methoxy methyl(meth)acrylamide and N-propoxy methyl(meth)acrylamide; non-conjugated diene monomer including vinyl pyridine, vinyl norbornene, dicyclopentadiene and 1,4-hexadiene; and ethylenically unsaturated carboxylic ester monomer including methyl (meth)acrylate, ethyl (meth)acrylate, butyl (meth)acrylate, 2-ethylhexyl (meth)acrylate, trifluroethyl (meth)acrylate, tetrafluoropropyl (meth)acrylate, dibutyl maleate, dibutyl fumarate, diethyl maleate, methoxymethyl (meth)acrylate, ethoxyethyl (meth)acrylate, methoxyethoxyethyl (meth)acrylate, cyanomethyl (meth)acrylate, 2-cyanoethyl (meth)acrylate, 1-cyanopropyl (meth)acrylate, 2-ethyl-6-cyanohexyl (meth)acrylate, 3-cyanopropyl (meth)acrylate, hydroxyethyl (meth)acrylate, hydroxypropyl (meth)acrylate, glycidyl (meth)acrylate and dimethylamino ethyl(meth)acrylate.

The ethylenically unsaturated nitrile monomer and other ethylenically unsaturated monomer copolymerizable therewith can be used in an amount of 0.001 to 20 wt. % based on the total weight of 100 wt. % of the total monomers constituting the carboxylic acid-modified nitrile-based copolymer. If the content exceeds 20 wt. %, the balance between the soft wearing sensation and the tensile strength does not fit well. Therefore, the content is properly selected within the above range.

The carboxylic acid-modified nitrile based copolymer latex of the present invention can be prepared by emulsion polymerization by adding an emulsifier, a polymerization initiator, or molecular weight modifier to the monomer constituting the carboxylic acid-modified nitrile based copolymer, as already mentioned.

Specifically, the carboxylic acid-modified nitrile based copolymer latex is prepared through the steps comprising, step (a): adding a conjugated diene-based monomer, an ethylenically unsaturated nitrile monomer and an ethylenically unsaturated acid monomer, an emulsifier, a polymerization initiator and deionized water to a polymerization reactor;

step (b): performing emulsion polymerization; and step (c): stopping the polymerization.

In the step (a), the conjugated diene-based monomer, the ethylenically unsaturated nitrile monomer, the ethylenically unsaturated acid monomer, the emulsifier, and the polymerization initiator may be introduced into the polymerization reactor all at once or continuously. In addition, each component can be added all at once to the polymerization reactor, or the content of some of them is added to the polymerization reactor and then the remaining content can be continuously supplied to the polymerization reactor again.

The emulsifier is not particularly limited, but anionic surfactants, nonionic surfactants, cationic surfactants, and amphoteric surfactants can be used as emulsifiers. Among them, the anionic surfactants selected from the group consisting of alkylbenzene sulfonates, aliphatic sulfonates, sulfuric acid ester salts of higher alcohols, $\alpha$-olefin sulfonates and alkyl ether sulfuric acid ester salts are particularly preferably used.

At this time, the emulsifier is used in an amount of 0.3 to 10 parts by weight, preferably 0.8 to 8 parts by weight, more preferably 1.5 to 6 parts by weight, based on 100 parts by weight of the monomers constituting the carboxylic acid-modified nitrile based copolymer. If the content is less than the above range, the stability at the time of polymerization is lowered. On the contrary, if it exceeds the above range, there is a problem that it is difficult to prepare a dip-molded article due to the occurrence of a large amount of foam.

The polymerization initiator is not particularly limited, but a radical initiator can be used specifically. The radical initiator may include at least one selected from the group consisting of inorganic peroxides such as sodium persulfate, potassium persulfate, ammonium persulfate, potassium perphosphate and hydrogen peroxide; organic peroxides such as t-butyl peroxide, cumene hydroperoxide, p-menthane hydroperoxide, di-t-butyl peroxide t-butylcumyl peroxide, acetyl peroxide, isobutyl peroxide, octanoyl peroxide, dibenzoyl peroxide, 3,5,5-trimethylhexanol peroxide and t-butylperoxy isobutyrate; azobisisobutyronitrile, azobis-2,4-dimethylvaleronitrile, azobiscyclohexanecarbonitrile and methyl azobisisobutyrate. Among these radical initiators, inorganic peroxides are more preferable, and persulfates are particularly preferable.

The polymerization initiator is used in an amount of 0.01 to 2 part by weight, preferably 0.02 to 1.5 part by weight, based on 100 parts by weight of the total monomers constituting the carboxylic acid-modified nitrile based copolymer. If the content is less than the above range, the polymerization rate is lowered and thus it is difficult to produce the final product. On the contrary, if it exceeds the above range, the polymerization rate is too fast to control the polymerization.

The activating agent is not particularly limited and those ordinarily known in the art can be used. The examples thereof may include at least one selected from the group consisting of sodium formaldehyde sulfoxylate, sodium ethylenediamine tetraacetate, ferrous sulfate, dextrose, sodium pyrophosphate, and sodium sulfite.

The molecular weight modifier is not particularly limited, and for example, may include α-methylstyrene dimers; mercaptans, such as t-dodecyl mercaptan, n-dodecyl mercaptan and octyl mercaptan; halogenated hydrocarbons, such as carbon tetrachloride, methylene chloride and methylene bromide; and sulfur-containing compounds, such as tetraethylthiuram disulfide, dipentamethylenethiuram disulfide and diisopropylxanthogene disulfide. These molecular weight modifiers may be used alone or in combination of two or more. Among these, mercaptans are preferable, and t-dodecyl mercaptan may be more preferably used.

The amount of the molecular weight modifier used varies depending on the kind thereof, but may be preferably 0.1 to 2.0 parts by weight, preferably 0.2 to 1.5 parts by weight, more preferably 0.3 to 1.0 part by weight, more preferably 0.3 to 1.0 part by weight based on 100 parts by weight of the total monomers constituting the carboxylic acid-modified nitrile based copolymer. If the content is less than the above range, the physical properties of the dip-molded article are significantly deteriorated. On the contrary, if it exceeds the above range, there is a problem that the polymerization stability is lowered.

In addition, it is of course possible to add minor materials such as a chelating agent, a dispersing agent, a pH adjusting agent, a deoxidizing agent, a particle diameter adjusting agent, an anti-aging agent, and an oxygen scavenger, as needed.

The method of introducing the monomer mixture constituting the carboxylic acid-modified nitrile-based copolymer is not particularly limited, and may be any of a method in which the monomer mixture is introduced all at once into the polymerization reactor, a method in which the monomer mixture is continuously introduced into the polymerization reactor, a method in which a part of the monomer mixture is introduced into the polymerization reactor and the remaining monomer is continuously introduced to the polymerization reactor.

In the step (b), the polymerization temperature during the emulsion polymerization may be generally from 10 to 90° C., preferably from 20 to 80° C., more preferably 25 to 75° C., but is not particularly limited.

In the step (c), the conversion at the termination of the polymerization reaction may be 85% or more, preferably 88 to 99.9%, more preferably 90 to 99%. After the polymerization is stopped, unreacted monomers are removed and the solid content and pH are adjusted to obtain carboxylic acid-modified nitrile based copolymer latex for dip-molding.

The carboxylic acid-modified nitrile based copolymer latex has a glass transition temperature of −30° C. to −10° C. If the glass transition temperature of the latex is less than the above range, the tensile strength is remarkably lowered or the wearing sensation is deteriorated due to the stickiness of the gloves. On the contrary, if it is higher than the above range, a crack is generated in the dip-molded article, which is undesirable. The glass transition temperature can be adjusted by controlling the content of the conjugated diene monomer, and can be measured by differential scanning calorimetry.

The average particle diameter of the carboxylic acid-modified nitrile based copolymer latex may be 100 to 500 nm, preferably 150 to 250 nm. If the particle diameter of the latex for dip-molding is within the above range, the tensile strength of the prepared dip-molded article can be improved. At this time, the particle diameter of the latex for dip-molding can be adjusted by controlling the kind and content of the emulsifier, and the particle diameter can be measured by Laser (Laser Scattering Analyzer, Nicomp).

The carboxylic acid-modified nitrile based copolymer latex prepared by the above step is mixed with an aqueous solution of sodium polysulfide having hydrophilicity to prepare the latex composition for dip-molding The aqueous sodium polysulfide solution may be added to the latex all at once or several times portionwise If necessary, various additives such as an antiaging agent, an antioxidant, an antiseptic, an antibacterial agent, a wetting agent, a thickener, a dispersant, a pigment, a dye, a filler, a reinforcing agent and a pH adjuster may be added to the latex composition for dip-molding in a predetermined amount.

The latex composition for dip-molding according to the present invention has a solid concentration of 10 to 40 wt. %, preferably 15 to 35 wt. %, more preferably 15 to 30 wt. %. If the concentration is too low, the transport efficiency of the latex composition will decrease. If it is too high, the solid concentration may cause an increase in viscosity, and it may cause problems such as storage stability and the like. Therefore, the concentration is appropriately adjusted within the above range.

The pH of the latex composition for dip-molding may be 8 to 12, preferably 9 to 11, more preferably 9.3 to 10.5. If the pH is out of the above range, stability of the latex composition for dip-molding may be deteriorated.

At this time, the pH of the latex composition for dip-molding can be adjusted by adding, when preparing the latex for dip-molding, a certain amount of a pH adjusting agent. As the pH adjuster, 1 to 5% aqueous potassium hydroxide solution or 1 to 5% aqueous ammonia may be used.

Dip-Molded Article

In addition, the present invention provides a dip-molded article made from the latex composition for dip-molding.

The dip-molded article according to one embodiment of the present invention is not particularly limited and can be prepared by a method commonly known in the art, and for example, can be prepared by using a direct dipping method, an anode coagulation dipping method, a Teague's coagulation dipping method, or the like. Preferably, the anode coagulation dipping method can be used. In the case of producing the dip-molded article using the anode coagulation dipping method, there is an advantage that the dip-molded article having a uniform thickness can be produced.

As a specific example, the dip-molded article can be prepared through steps comprising, immersing the hand-shaped mold for dip-molding in the coagulant solution and adhering the coagulant to the surface of the mold for dip-molding (step a);

immersing the dip-molding mold having the coagulant adhering to the surface thereof in the latex composition for dip-molding to form a dip-molding layer (step b); and heat-treating the dip-molding layer to cross-link the latex resin (step c).

Step (a) is a step for adhering a coagulant to the surface of the hand-shaped mold for dip-molding, and is not particularly limited, but may be carried out by dipping the mold for dip-molding in the coagulant solution for at least one minute and taking out the mold and then drying at 70 to 150° C.

The coagulant solution is a solution in which the coagulant is dissolved in water, an alcohol or a mixture thereof, and may generally contain 5 to 50 wt. % of coagulant, preferably 10 to 40 wt. % of coagulant.

The above-mentioned coagulant is not particularly limited, and for example include metal halides such as barium chloride, calcium chloride, magnesium chloride, zinc chloride and aluminum chloride; nitrates such as barium nitrate, calcium nitrate and zinc nitrate; acetates such as barium acetate, calcium acetate and zinc acetate; and sulfates such as calcium sulfate, magnesium sulfate and aluminum sulfate. Calcium chloride, calcium nitrate and the combination thereof are preferred.

The step (b) is a step for forming the dip-molding layer of the latex composition for dip-molding according to the present invention on the mold for dip-molding in which the coagulant is adhered, and in the step (b), the dip-molding layer may be formed by immersing the coagulant-adhered mold for dip-molding in the latex composition for dip-molding for at least one minute and taking out the mold.

The step (c) is a step for obtaining the dip-molded article by cross-linking the latex resin to the dip-molding layer and may be performed by heat-treating the dip-molding layer The heat-treating is not particularly limited, but may be performed by, for example, performing a first heat-treating at 70 to 150° C. for 1 minute to 10 minutes and then a second heat-treating at 100 to 180° C. for 5 minutes to 30 minutes.

During the heat-treating, the water component is first evaporated from the dip-molding layer, and the latex resin of the dip-molding layer is hardened through cross-linking, thereby obtaining the dip-molded article.

The dip-molded article is not particularly limited and may be applied to various latex industries, and for example, may be applied to at least one molded article selected from the group consisting of inspection gloves, condoms, catheters, industrial gloves, surgical gloves, household gloves, industrial gloves and health care products.

Hereinafter, preferred examples will be provided for better understanding of the present invention. It will be apparent to those skilled in the art that the following examples are only provided to illustrate the present invention, and various modifications and alternations are possible within the scope and technical range of the present invention. Such modifications and alternations are intended to fall within the scope of the appended claims.

EXAMPLES

Example 1: Preparation of Latex Composition for Dip-Molding and Dip-Molded Article (Preparation of Carboxylic Acid-Modified Nitrile Based Copolymer Latex)

A 10 L high-pressure reactor equipped with a stirrer, a thermometer, a condenser, and an inlet of nitrogen gas and configured to continuously feed a monomer, an emulsifier, and a polymerization initiator was replaced with nitrogen. Thereafter, to the high-pressure reactor, 2.5 parts by weight of alkyl benzenesulfonic acid sodium, 0.5 part by weight of t-dodecyl mercaptan and 140 parts by weight of ion exchange water, relative to 100 parts by weight of monomer mixture of 25 wt. % of acrylonitrile, 70 wt. % of 1,4-butadiene, and 5 wt. % of methacrylic acid were added and the temperature was raised to 48° C.

After raising the temperature, 0.25 parts by weight of potassium persulfate as a polymerization initiator was added. When the conversion rate reached 95%, the polymerization was stopped by adding 0.1 part by weight of sodium dimethyl dithiocarbamate. Unreacted monomers were removed through a deodorization process, and ammonia water, an antioxidant and a defoaming agent were added to obtain a carboxylated acrylonitrile-butadiene based copolymer latex having a solid concentration of 45% and pH of 8.3.

As a result of analyzing the latex, the glass transition temperature was −10° C. and the average particle diameter was 110 nm.

(Preparation of Composition for Dip-Molding)

To the prepared carboxylic acid-modified nitrile based copolymer latex of 100 parts by weight, a 10% concentration of hydrophilic sodium polysulfide solution (sodium polysulfide) was added to prepare a mixture.

To such a mixture, a potassium hydroxide solution and an appropriate amount of secondary distilled water were added to obtain a composition for dip-molding having a solid concentration of 25% and pH of 10.0.

(Preparation of Dip-Molded Article)

The coagulant solution was prepared by mixing 18 parts by weight of calcium nitrate, 87.5 parts by weight of distilled water, and 0.5 part by weight of a wetting agent (Teric 320 produced by Huntsman Corporation, Australia). A hand-shaped ceramic mold was immersed in this solution for 10 seconds, taken out and then dried at 80° C. for 4 minutes to adhere the coagulant to the hand-shaped mold.

Next, the mold coated with the coagulant was immersed in the composition for dip-molding for 10 seconds, pulled up, dried at 80° C. for 2 minutes, and immersed in water or warm water for 1 minute. Thereafter, it was allowed to cross-link at 120° C. for 20 minutes. The cross-linked dip-molding layer was taken off from the hand shaped mold to obtain a glove-shaped dip-molded article. The physical properties of this dip-molded article are shown in Tables 1 and 2.

In order to confirm the syneresis time, the mold coated with the coagulant was immersed in the above-mentioned composition for dip-molding for 10 seconds and then pulled up, dried at 120° C. for 6 minutes, and immersed in water or warm water for 3 minutes. When drying at 120° C. for 6 minutes, the time of dropping of water droplets was checked to confirm the syneresis time. The syneresis time is shown in Table 1 and Table 2 below.

Example 2: Preparation of Latex Composition for Dip-Molding and Dip-Molded Article A latex composition for dip-molding was prepared in the same manner as in Example 1 except that the hydrophilic sodium polysulfide was used in a ratio of 0.7 parts by weight, and using this, a glove-shaped dip-molded article was prepared.

Example 3: Preparation of Latex Composition for Dip-Molding and Dip-Molded Article A latex composition for dip-molding was prepared in the same manner as in Example 1 except that the hydrophilic sodium polysulfide was used in a ratio of 1.0 part by weight, and using this, a glove-shaped dip-molded article was prepared.

Comparative Example 1: Preparation of Latex Composition for Dip-Molding and Dip-Molded Article A latex composition for dip-molding was prepared in the same manner as in Example 1 except that the vulcanizing agent (sulfur) of 1 part by weight instead of hydrophilic sodium polysulfide was used, and using this, a glove-shaped dip-molded article was prepared.

Experimental Example 1: Evaluation of Physical Properties of Dip-Molded Article The physical properties of the dip-molded articles prepared in the above Examples and Comparative Example were measured. The following physical properties were measured after the latex composition for dip-molding was aged for 1 and 3 days, and the results are shown in Tables 1 and 2 below.

(1) Tensile Strength, Elongation, and Modulus (MPa) at 300% and 500%

Dumbbell-shaped specimens were prepared from the obtained dip-molded article according to EN 455-2. Subsequently, the specimen was pulled at a stretch rate of 500 mm/min, and modulus at 300% and 500% elongation, tensile strength at break and elongation at break were measured.

(2) Durability

After preparing a solution for measuring the durability of a dip-molded article at 25° C. consisting of 16 parts by weight of sodium chloride, 16 parts by weight of lactic acid, 3.2 parts by weight of urea and 64.8 parts by weight of water, the specimens of the nitrile rubber gloves were inserted into a durability measuring instrument, and the specimens were repeatedly pulled up to 2 times its original length and released (at most 2 times for stretching, at least 1 time for reducing) and the number of times until breakage was measured. At this time, the larger number of times means the better durability.

(3) Syneresis

When drying at 120° C. for 6 minutes, the time of dropping of water droplets was checked to confirm the syneresis time. At this time, the longer syneresis time means the better workability.

TABLE 1

| | Aging for 1 day | | | | | |
|---|---|---|---|---|---|---|
| | Tensile strength (MPa) | Modulus at 300% (MPa) | Modulus at 500% (MPa) | Syneresis (sec) | Elongation (%) | Durability (number of times) |
| Example 1 | 39.5 | 4.7 | 12.2 | 355 | 635 | 408 |
| Example 2 | 40.2 | 4.8 | 12.4 | >360 | 630 | 439 |
| Example 3 | 40.0 | 4.7 | 12.2 | >360 | 619 | 500 |
| comparative Example 1 | 39.1 | 5.2 | 12.6 | 290 (formed) | 641 | 252 |

TABLE 2

| | Aging for 3 days | | | | | |
|---|---|---|---|---|---|---|
| | tensile strength (MPa) | Modulus at 300% (MPa) | Modulus at 500% (MPa) | Syneresis (sec) | Elongation (%) | Durability (number of times) |
| Example 1 | 38.4 | 5.7 | 14.1 | 360 (formed) | 603 | 192 |
| Example 2 | 39.4 | 5.8 | 14.7 | >360 | 618 | 200 |
| Example 3 | 39.6 | 5.9 | 15.7 | >3660 | 625 | 222 |
| comparative Example 1 | 38.4 | 5.8 | 16.6 | 360 (formed) | 597 | 170 |

The results of Tables 1 and 2 show that in Example 1 to 3 using sodium polysulfide as vulcanizing agent according to the present invention, the tensile strength, modulus and elongation were equal to or higher than those of Comparative Example 1 in which sulfur was used, and the syneresis time was also longer.

However, it can be seen that with respect to the modulus (i.e., Modulus) values at specific 300% and 500%, the dip-molded articles of Examples 1 to 3 are slightly lower overall compared to Comparative Example 1, so that a good feel of use can be created. In addition, the durability was remarkably superior.

Also, comparing the numerical values of Table 1 and Table 2 obtained after the composition for dip-molding was aged for 1 day and 3 days, it can be seen that in the case of aging for 1 day, the numerical values of the Examples were superior to those of the Comparative Example, but after aging for 3 days, the numerical values of the Examples and the Comparative example have similar results. These results indicate that the sodium polysulfide according to the present invention can cause cross-linking quickly and rapidly as compared with sulfur and this is because the sodium polysulfide penetrates more rapidly into the carboxylic acid-modified nitrile based latex due to its high hydrophilicity.

The latex composition for dip-molding according to the present invention can be used for preparation of latex articles, for example, health care products such as various industrial and household gloves.

The invention claimed is:

1. A latex composition for dip-molding comprising a carboxylic acid-modified nitrile copolymer latex copolymerized from conjugated diene monomers, ethylenically unsaturated nitrile monomers and ethylenically unsaturated acid monomers; and sodium polysulfide.

2. The latex composition for dip-molding according to claim 1, wherein the latex composition for dip-molding contains 0.1 to 5 parts by weight of sodium polysulfide based on 100 parts by weight of carboxylic acid-modified nitrile copolymer.

3. The latex composition for dip-molding according to claim 1, wherein the sodium polysulfide is used as an aqueous solution having a concentration of 5 to 20 wt. %.

4. The latex composition for dip-molding according to claim 1, wherein the carboxylic acid-modified nitrile copolymer latex has a glass transition temperature of −30° C. to −10° C. and an average particle diameter of 100 nm to 500 nm.

5. The latex composition for dip-molding according to claim 1, wherein the carboxylic acid-modified nitrile copolymer is copolymerized from 40 to 89 wt % of the conjugated diene monomer, 10 to 50 wt % of ethylenically unsaturated nitrile monomer and 0.1 to 10 wt % of ethylenically unsaturated acid monomer based on a total sum of 100% by weight of the monomers.

6. The latex composition for dip-molding according to claim 1, wherein the conjugated diene monomer is at least one selected from the group consisting of 1,3-butadiene, 2,3-dimethyl-1,3-butadiene, 2-ethyl-1,3-butadiene, 1,3-pentadiene and isoprene.

7. The latex composition for dip-molding according to claim 1, wherein the ethylenically unsaturated nitrile monomer is at least one selected from the group consisting of acrylonitrile, methacrylonitrile, fumaronitrile, α-chloronitrile and α-cyanoethyl acrylonitrile.

8. The latex composition for dip-molding according to claim 1, wherein the ethylenically unsaturated acid monomer is at least one selected from the group consisting of acrylic acid, methacrylic acid, itaconic acid, maleic acid, fumaric acid, maleic anhydride, citraconic anhydride, styrene sulfonate, monobutyl fumarate, monobutyl maleate and mono-2-hydroxy propyl maleate.

9. The latex composition for dip-molding according to claim 1, wherein the carboxylic acid modified nitrile copolymer is copolymerized with adding additionally an ethylenically unsaturated monomer along with the conjugated diene monomers, the ethylenically unsaturated nitrile monomers and the ethylenically unsaturated acid monomers.

10. A dip-molded article prepared by dip-molding the latex composition for dip-molding according to claim 1.

11. The dip-molded article according to claim 10, wherein the dip-molded article is at least one selected from the group consisting of inspection gloves, condoms, catheters, industrial gloves, surgical gloves, household gloves, industrial gloves and health care products.

* * * * *